US012729965B2

(12) United States Patent
Pjetri et al.

(10) Patent No.: US 12,729,965 B2
(45) Date of Patent: Sep. 8, 2026

(54) SYSTEMS AND METHODS FOR LOCATION TRACKING AND ASSOCIATION OF MULTIPLE DEVICES

(71) Applicant: Verizon Patent and Licensing Inc., Basking Ridge, NJ (US)

(72) Inventors: Aurel Pjetri, Florence (IT); Luca Bravi, Sesto Fiorentino (IT); Marco Boschi, Ravenna (IT); Stefano Caprasecca, Florence (IT); Tommaso Mugnai, Florence (IT)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 237 days.

(21) Appl. No.: 18/529,520

(22) Filed: Dec. 5, 2023

(65) Prior Publication Data

US 2025/0180362 A1 Jun. 5, 2025

(51) Int. Cl.
*G01C 21/30* (2006.01)

(52) U.S. Cl.
CPC .................................... *G01C 21/30* (2013.01)

(58) Field of Classification Search
CPC ............................... G01C 21/30; H04W 4/029
See application file for complete search history.

(56) References Cited

U.S. PATENT DOCUMENTS

2016/0146615 A1* 5/2016 Abhishek ................ H04W 4/44 701/519
2019/0180610 A1* 6/2019 Liu ........................ G06N 20/20
2021/0390309 A1* 12/2021 Guo .......................... G06T 7/90
2021/0397854 A1* 12/2021 Brizzi ..................... G06T 7/248

FOREIGN PATENT DOCUMENTS

CN 116525129 A * 8/2023 ............. G16H 50/80

OTHER PUBLICATIONS

Machine Translation of CN-116525129-A (Year: 2023).*

* cited by examiner

*Primary Examiner* — Sahar Motazedi

(57) ABSTRACT

A device may receive, from a first device, first tracking data that includes first temporal data and first location data, and may receive, from a second device, second tracking data that includes second temporal data and second location data. The device may generate a first spatio-temporal object based on the first tracking data, and may generate a second spatio-temporal object based on the second tracking data. The device may calculate a matching score associated with the first spatio-temporal object and the second spatio-temporal object, and may determine whether the matching score satisfies a score threshold. The device may determine that the first device is associated with the second device based on determining that the matching score satisfies the score threshold, and may perform one or more actions based on determining that the first device is associated with the second device.

20 Claims, 11 Drawing Sheets

400

100

100

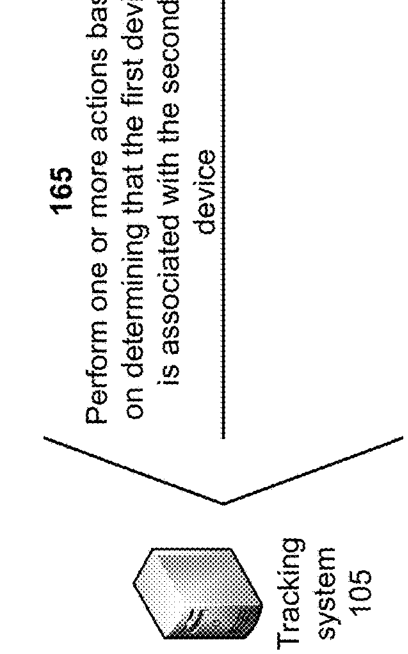

Determine that a vehicle is associated with the first device and the second device Determine that the first device is correctly installed in a vehicle associated with the second device Determine that a driver associated with the first device is correctly utilizing a vehicle associated with the second device Determine that an asset associated with the first device is correctly paired with a vehicle associated with the second device Determine that a user of the first device operates a vehicle associated with the second device

FIG. 1H

SYSTEMS AND METHODS FOR LOCATION TRACKING AND ASSOCIATION OF MULTIPLE DEVICES

BACKGROUND

Multiple devices may be provided in a vehicle for different purposes. For example, a vehicle may include a dashcam for capturing video, a vehicle tracking unit (VTU) for navigation, an asset tracker for tracking assets carried by the vehicle, a mobile phone for a vehicle driver or passenger, and/or the like.

BRIEF DESCRIPTION OF THE DRAWINGS

FIGS. 1A-1H are diagrams of an example associated with location tracking and association of multiple devices.

DETAILED DESCRIPTION OF EXAMPLE EMBODIMENTS

Figure 1A:
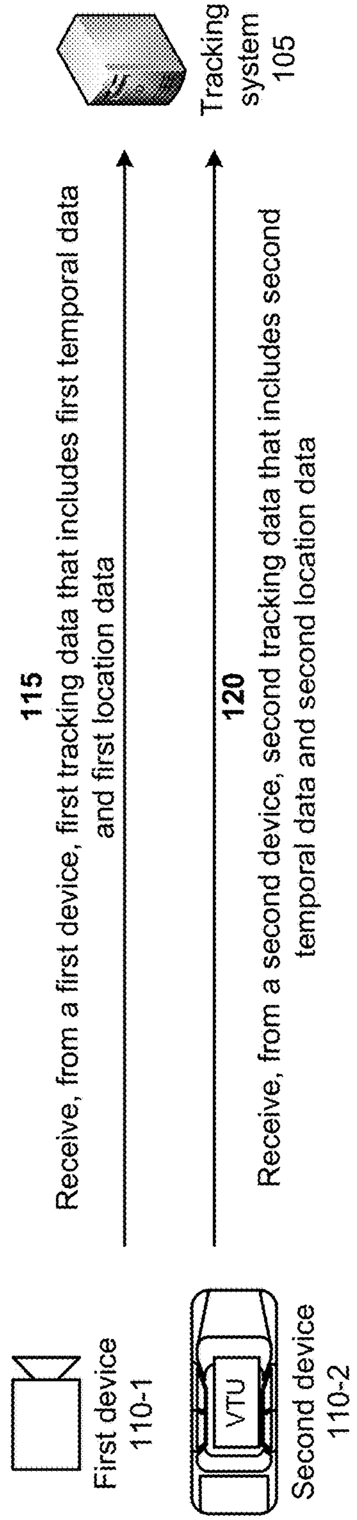

The following detailed description of example implementations refers to the accompanying drawings. The same reference numbers in different drawings may identify the same or similar elements.

Associating multiple devices to a particular vehicle may enable various services to function correctly. For example, a vehicle may include a VTU to continuously monitor vehicle location (e.g., latitude and longitude) and behavior (e.g., harsh driving events), and a dash-cam to continuously record driving video footage along with global positioning system (GPS) coordinates and a timestamp. When the VTU triggers a harsh driving event, video footage from the paired dashcam may be retrieved and analyzed to provide further insights to a driver and/or a vehicle fleet manager. In such an example, correct functioning of the service requires that the VTU and dashcam association (e.g., assignment) be performed correctly upon initial installation, configuration and the like. Often there are errors during manual installation of the VTU and/or the dashcam. In another example, a vehicle (e.g., a VTU) may be associated with (e.g., assigned to) a mobile phone of a driver of a vehicle to ensure that the driver is matched with a correct vehicle of a fleet of vehicles. This may be a crucial task when a fleet manager wants to correctly account for a driver's activity and to monitor driving behavior. However, assignment of a VTU and mobile phone is also a manual process that often results in assignment errors.

Thus, current techniques for associating multiple devices to a single vehicle in a fleet of vehicles consume computing resources (e.g., processing resources, memory resources, communication resources, and/or the like), networking resources, and/or other resources associated with failing to accurately associate different devices, failing to provide services based on inaccurate association of different devices, generating errors with services based on inaccurate association of different devices, attempting to determine a correct association for a device incorrectly associated with another device, and/or the like.

Some implementations described herein relate to a tracking system that provides location tracking and association of multiple devices. For example, the tracking system may receive, from a first device, first tracking data that includes first temporal data and first location data, and may receive, from a second device, second tracking data that includes second temporal data and second location data. The tracking system may generate a first object (e.g., a first spatio-temporal object) based on the first tracking data, and may generate a second object (e.g., a second spatio-temporal object) based on the second tracking data. The tracking system may determine whether a condition exists for the first tracking data and the second tracking data. The tracking system may selectively: calculate a matching score associated with the first object and the second object based on determining that the condition does not exist for the first tracking data and the second tracking data, or prevent calculation of the matching score based on determining that the condition exists for the first tracking data and the second tracking data. The tracking system may determine whether the matching score satisfies a score threshold. The tracking system may selectively: determine that the first device is associated with the second device based on determining that the matching score satisfies the score threshold, or determine that the first device is not associated with the second device based on determining that the matching score fails to satisfy the score threshold.

In this way, the tracking system provides location tracking and association of multiple devices. For example, the tracking system may match two or more trajectories generated by two or more independent devices. The tracking system may match two or more devices based on considering both spatial information and temporal information associated with the two or more trajectories. The tracking system may determine that the two or more devices have matching trajectories if the two or more devices cover a same path at a same time (e.g., effectively traveling together). Matching two or more trajectories both spatially and temporally may enable the tracking system to ensure accuracy in geospatial services (e.g., applications). Thus, the tracking system may conserve computing resources, networking resources, and/or other resources that would have otherwise been consumed by failing to accurately associate different devices, failing to provide services based on inaccurate association of different devices, generating errors with services based on inaccurate association of different devices, attempting to determine a correct association for a device incorrectly associated with another device, and/or the like.

FIGS. 1A-1H are diagrams of an example 100 associated with location tracking and association of multiple devices. As shown in FIGS. 1A-1H, example 100 includes a tracking system 105 associated with a first device 110-1 and a second device 110-2 (collectively referred to as devices 110). The tracking system 105 may include a system that provides location tracking and association of multiple devices (e.g., the devices 110). The first device 110-1 and/or the second device 110-2 may include a dashcam for a vehicle, a VTU of a vehicle, a geolocator, a mobile telephone, a tablet computer, an asset with a geolocator, and/or the like. The first device 110-1 and the second device 110-2 may be linked, paired, or associated with one another in some way (e.g., the first device 110-1 and the second device 110-2 may be placed in the same vehicle) and thus move together. The tracking system 105 may determine whether the first device 110-1 and the second device 110-2 are linked, and a level of confidence associated with such a determination. Further details of the tracking system 105 and the devices 110 are provided elsewhere herein.

As shown in FIG. 1A, and by reference number 115, the tracking system 105 may receive, from the first device 110-1, first tracking data that includes first temporal data and first location data. For example, the first device 110-1 may generate the first tracking data and may provide the first tracking data to the tracking system 105. The first device 110-1 may generate and transmit data points of the first tracking data. Each data point may include first temporal data (e.g., a timestamp indicating when a data point is generated) and first location data (e.g., a spatial location identified by GPS coordinates (latitude and longitude) or in another type of location reference system). In some implementations, the tracking system 105 may store the first tracking data in a data structure (e.g., a database, a list, a table, and/or the like) associated with the tracking system 105. Although implementations describe three-dimensional and four-dimensional data, the implementations may be utilized with a single dimension (e.g., considering only the time and discarding location data) up to an unlimited quantity of dimensions (e.g., external temperature, atmospheric pressure, fuel level, may be utilized if detected).

In some implementations, the first device 110-1 may generate the first tracking data via continuous generation (e.g., each new data point is generated at a fixed frequency), event-based generation (e.g., each new data point is generated only when a specific event occurs, such as an engine being turned on or off, or a harsh driving event), or mixed generation (e.g., a combination of continuous generation and event-based generation where new data points are generated at a fixed frequency and additional data points are generated when specific events occur). Regardless of the type of tracking data generation, the first tracking data may be discrete in at least the time dimension. The first tracking data may include data points in three-dimensional space or four-dimensional space (e.g., two or three spatial dimensions and one temporal dimension).

As further shown in FIG. 1A, and by reference number 120, the tracking system 105 may receive, from the second device 110-2, second tracking data that includes second temporal data and second location data. For example, the second device 110-2 may generate the second tracking data and may provide the second tracking data to the tracking system 105. The second device 110-2 may generate and transmit data points of the second tracking data. Each data point may include second temporal data (e.g., a timestamp indicating when a data point is generated) and second location data (e.g., a spatial location identified by location information, such as GPS coordinates (latitude and longitude) or in another type of location reference system). In some implementations, the tracking system 105 may store the second tracking data in the data structure associated with the tracking system 105.

In some implementations, the second device 110-2 may generate the second tracking data via continuous generation, event-based generation, or mixed generation (e.g., a combination of continuous generation and event-based generation). Regardless of the type of tracking data generation, the second tracking data may be discrete in at least the time dimension. The second tracking data may include data points in three-dimensional space or four-dimensional space (e.g., two or three spatial dimensions and one temporal dimension).

In some implementations, tolerances may be applied when comparing the first temporal data of the first tracking data to the second temporal data of the first tracking data, when comparing the first location data of the first tracking data to the second location data of the second tracking data, and/or the like. Different dimensions (e.g., time, location, and/or the like) may be subject to different tolerances to account for different scales and/or a level of uncertainty (e.g., four dimensional data may include four thresholds). Selection of the tolerances may depend on a specific use case. For example, for extremely accurate matches, the tolerances may be very small so that tracking system 105 may identify only closely matching trajectories.

Figure 1B:
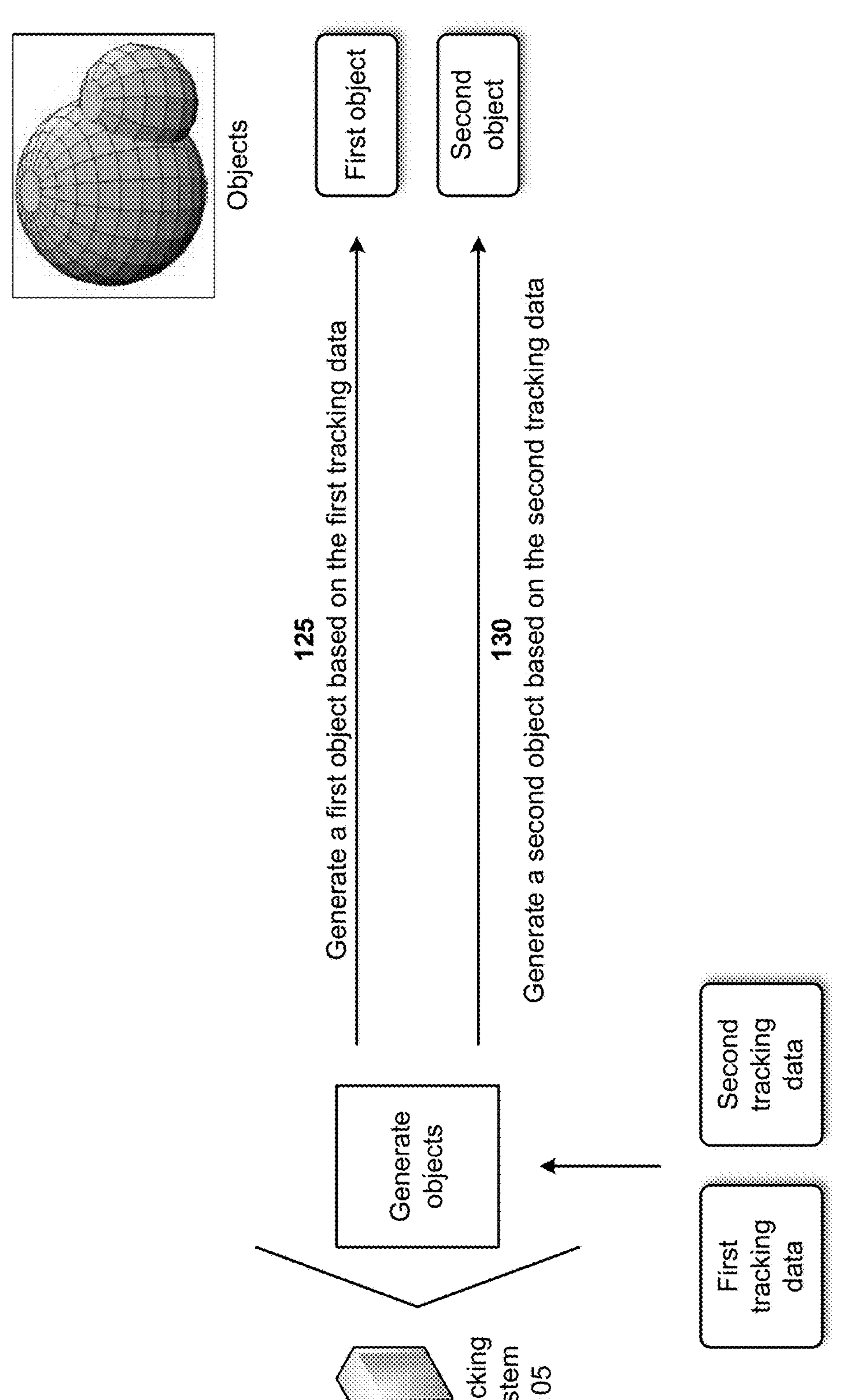

As shown in FIG. 1B, and by reference number 125, the tracking system 105 may generate a first object based on the first tracking data. For example, the tracking system 105 may utilize the first tracking data to generate images of a first series of ellipsoids (or hyper-ellipsoids) (referred to herein as a first bubble) that includes semi-axes in dimensions equal to tolerances associated with each coordinate and centers on each data point. The first bubble may delimit a region of space and time where data points are expected to be generated by the second device 110-2 if trajectories of the first device 110-1 and the second device 110-2 match.

In some implementations, when data point generation is continuous or mixed, and the data points are sufficiently temporally close to each other, the first bubble of a trajectory may form an image of a first time-space tube (e.g., a cylindrical object) along which the first device 110-1 moved over time. The first tube may be made mathematically continuous by means of interpolation (e.g., linear interpolation) but more complex models may be utilized. For example, road matching models may be utilized to account for the fact that the first device 110-1 moves along roads. The first tube may include a region of space (e.g., three-dimensional or higher-dimensional) that is expected to also match tubes from other trajectories.

As further shown in FIG. 1B, and by reference number 130, the tracking system 105 may generate a second object based on the second tracking data. For example, the tracking system 105 may utilize the second tracking data to generate images of a second series of ellipsoids (or hyper-ellipsoids) (referred to herein as a second bubble) that includes semi-axes in dimensions equal to tolerances associated with each coordinate and centers on each data point. The second bubble may delimit a region of space and time where data points are expected to be generated by the first device 110-1 if trajectories of the first device 110-1 and the second device 110-2 match. The tracking system 105 may generate mathematical representations of the first object and the second object and the object terminology and images may be utilized for ease of interpretation.

In some implementations, when data point generation is continuous or mixed, and the data points are sufficiently temporally close to each other, the second bubble of a trajectory may form an image of a second time-space tube along which the second device 110-2 moved. The second tube may be made mathematically continuous by means of interpolation (e.g., linear interpolation) but more complex models may be utilized. For example, road matching models may be utilized to account for the fact that the second device 110-2 moves along roads. The second tube may include a region of space (e.g., three-dimensional or higher-dimensional) that is expected to match tubes from other trajectories.

Figure 1C:
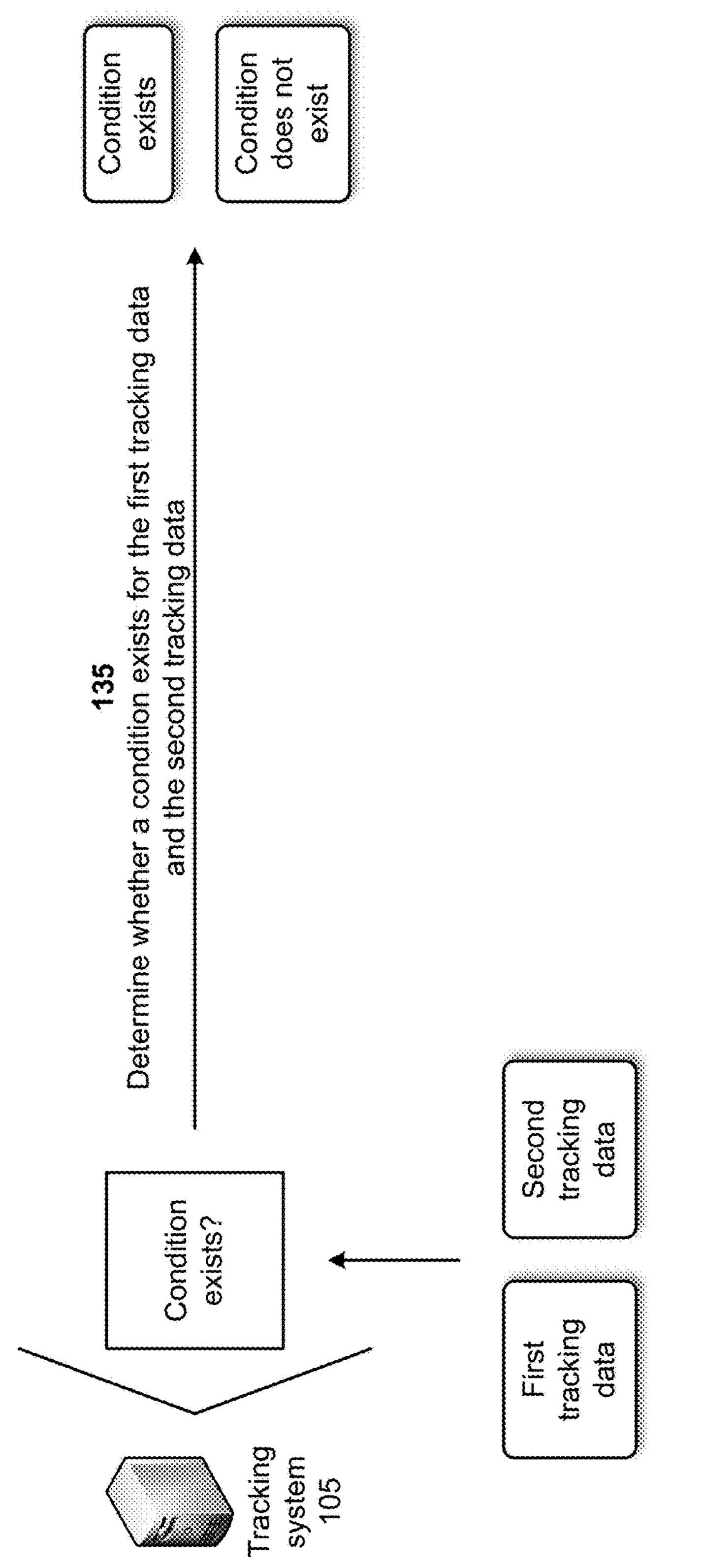

As shown in FIG. 1C, and by reference number 135, the tracking system 105 may determine whether a condition exists for the first tracking data and the second tracking data. For example, the tracking system 105 may calculate matching scores (e.g., described below) for multiple devices 110. Such calculations may be resource intensive but may be precluded when the tracking system 105 determines that a condition exists for tracking data generated by the multiple devices 110. In some implementations, the tracking system 105 may determine that a condition does not exist for the first tracking data and the second tracking data. Alternatively, the tracking system 105 may determine that a condition exists for the first tracking data and the second tracking data.

In some implementations, the condition includes a first trajectory duration associated with the first tracking data failing to match a second trajectory duration associated with the second tracking data (e.g., if the first device 110-1 records a fifteen-minute-long trajectory, the first device 110-1 will not match the second device 110-2 that records a several-hours-long trajectory), a first spatial bounding box associated with the first tracking data failing to intersect a second spatial bounding box associated with the second tracking data (e.g., if the first device 110-1 moved in an area that is clearly different from an area moved in by the second device 110-2), a first temporal span associated with the first tracking data failing to intersect a second temporal span associated with the second tracking data (e.g., a trajectory recorded between 9:00 and 11:00 may not match another trajectory recorded between 10:30 and 12:30), the first device 110-1 and the second device 110-2 being associated with different accounts, and/or the like. In one example, the tracking system 105 may determine which dashcam and VTU pairs are associated with which vehicles. In such an example, the tracking system 105 may consider only dashcams and VTUs belonging to the same accounts and/or vehicles.

Figure 1D:
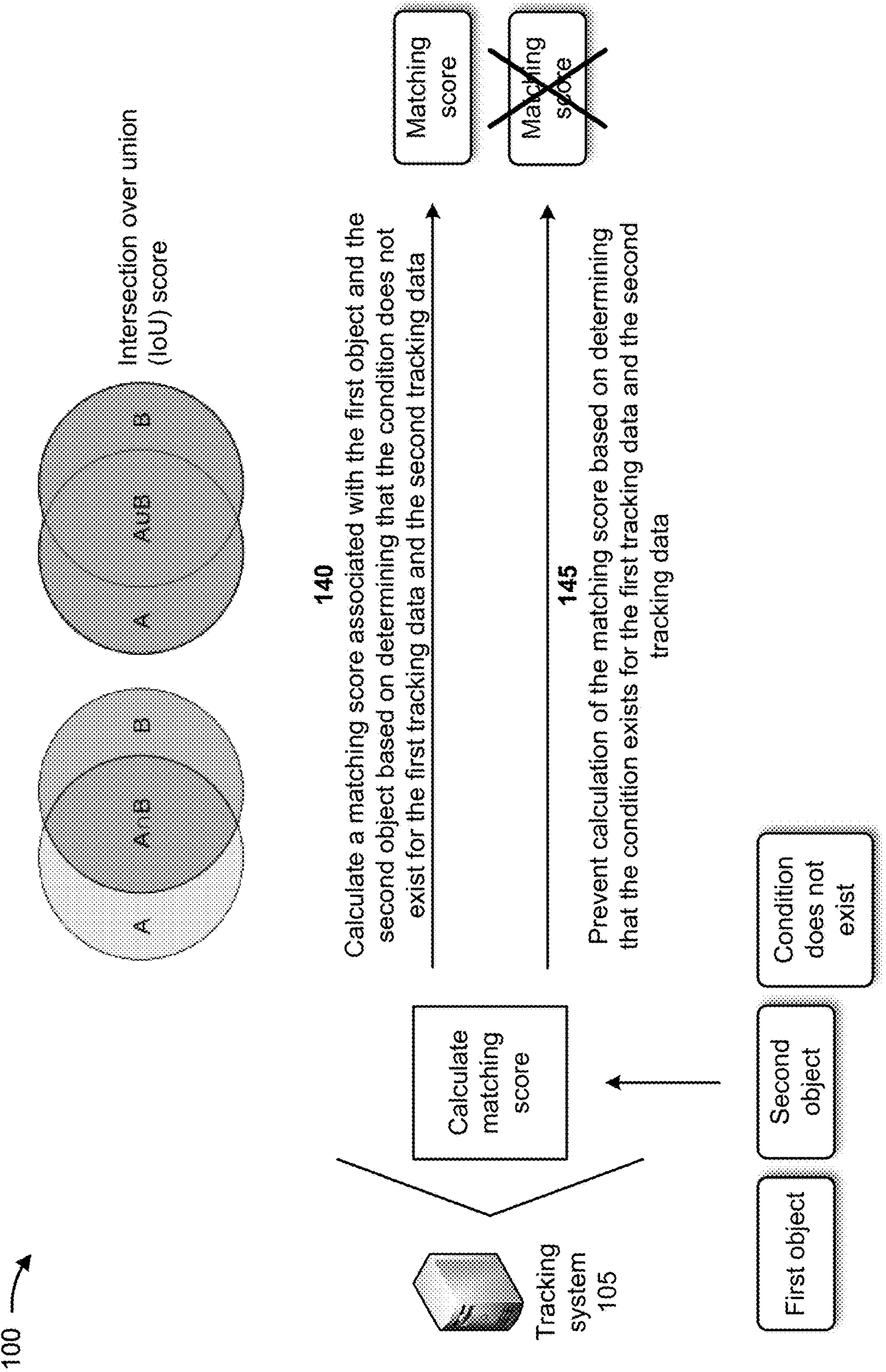

As shown in FIG. 1D, and by reference number 140, the tracking system 105 may calculate a matching score associated with the first object and the second object based on determining that the condition does not exist for the first tracking data and the second tracking data. For example, when the tracking system 105 determines that the condition does not exist for the first tracking data and the second tracking data, the tracking system 105 may calculate the matching score associated with the first object and the second object. In some implementations, when calculating the matching score associated with the first object and the second object, the tracking system 105 may calculate, as the matching score, an intersection over union (IoU) between the first object and the second object.

Having defined the first object and the second object, the tracking system 105 may calculate the IoU (e.g., using a Jaccard index) for the three-dimensional or four-dimensional objects as a ratio of an intersection volume over a union volume. The IoU may be mathematically constrained to be a real number between zero and one, where a greater IoU indicates better trajectory overlap between the first device 110-1 and the second device 110-2. The matching score may be calculated for both bubble and tube forms. For example, when two trajectories are described by a set of bubbles (e.g., in event-based data points), the IoU between the two sets of bubbles may indicate how closely a specific event has been recorded by the first device 110-1 and the second device 110-2. The more the first device 110-1 and the second device 110-2 record similar data, centers of the two sets of bubbles (e.g., in time and space) are nearer and the IoU score value is higher. In another example, when two trajectories are described by tubes (e.g., for continuous or mixed data points), the IoU between the tubes may be calculated instead.

In one example (e.g., for two sets of bubbles) where data point spatial information is GPS-based (e.g., includes latitudes, longitudes, and timestamps), the tracking system 105 may set tolerance values for each of the three dimensions (e.g., latitude, longitude, and time). For simplicity, a spatial tolerance may be utilized as a unit of measure for the spatial coordinates and a time tolerance may be utilized as a unit of measure for the time coordinates. Therefore, the two sets of bubbles may form two spheres. If additional dimensions are included, the two sets of bubbles may form two hyperspheres.

Two spheres in a three-dimensional space may intersect and include a plane of contact and an intersection volume calculated by a sum of two spherical caps defined by the plane of contact. The tracking system 105 may calculate an IoU score ($S_e$) between the two spheres relative to a generic event (e) as follows:

$$S_e = \frac{V_{intersection}}{V_{union}} = \frac{V_{intersection}}{V_1 + V_2 - V_{intersection}} = \frac{\pi(r_1 + r_2 - d)^2\left(d^2 + 2dr_2 - 3r_2^2 + 2dr_1 - 3r_1^2 + 6r_1r_2\right)/12d}{\left(4\pi r_1^3\right)/3 + \left(4\pi r_2^3\right)/3 - \pi(r_1 + r_2 - d)^2},$$

$$\left(d^2 + 2dr_2 - 3r_2^2 + 2dr_1 - 3r_1^2 + 6r_1r_2\right)/12d$$

where $r_1$ is a radius of sphere 1, $r_2$ is a radius of sphere 2, d is a distance between centers of the two spheres, $V_1$ is a volume of sphere 1, and $V_2$ is a volume of sphere 2. By construction, the radiuses of each of the spheres may be equal to one since the radius is measured in units of thresholds. Therefore, the formula for the IoU score ($S_e$) may be simplified as follows:

$$S_e = \frac{d^2(2-d)^2(d+4)}{-d^5 + 12d^3 - 16d^2 + 32}.$$

A total IoU score ($S_{total}$), when considering multiple bubbles, may be calculated as follows:

$$S_{total} = \frac{1}{N}\sum_{e=1}^{N}\frac{d^2(2-d)^2(d+4)}{-d^5 + 12d^3 - 16d^2 + 32},$$

where e is one of N evaluated events. When the radius is the same for all of the events, only the center distances change for different bubble pairs. $S_{total}$ may be a final IoU score that represents exactly how much the two series of bubbles agree, considering both spatial and time dimensions and within defined tolerances.

Although implementations described herein relate to the case of two devices 110, the implementations may be extended to cases of three or more devices 110 based on the transitivity property (e.g., if device A is linked to device B and device B is linked to device C, then device A is also linked to device C). To compute a match between two devices 110, multiple situations may be encountered, depending on the type of data point generation. In a first case, both devices 110 may utilize continuous data point generation. In the first case, the IoU between two tubes may be computed. In a second case, both devices 110 may utilize event-based data point generation. In the second case, matching may be determined if the devices 110 generate data points when a same event occurs, or if two events happen concurrently. For example, in an engine-on event, both a VTU and a dashcam may detect the engine-on event and both the VTU and the dashcam may generate a specific event with a data point. In such an example, the IoU between two sets of bubbles may be computed. In a third case, one device (device A) may utilize continuous data point generation and another device (device B) may utilize event-based data point generation. In the third case, matching may be determined by sampling a continuous signal from device A at times when events from device B are reported. This way, both devices may produce event-based data points, and the IoU between two sets of bubbles may be computed.

The first case described above may include matching discrete paths in a three-dimensional or four-dimensional space. To carry out the matching, it may be assumed that a frequency, at which points describing the discrete paths are reported, is great enough to capture a good approximation of motions of the devices 110. For example, if the frequency of capture is one data point every hour then the matching may be poor because over such a long period of time, movement from one point to a next point cannot be assumed to be in a straight line. With such an assumption, periods of times longer than a typical interval between data points may be considered to be periods when a device 110 is not moving. Each device 110 may be associated with a sequence of tubes across time and space and over a time period (e.g., one week). Thus, only devices 110 with a same quantity of paths (e.g., or substantially the same quantity) should be matched together when such paths are equivalent.

In some implementations, calculating of a matching score for a pair of devices 110 may be performed based on transforming signals (e.g., tracking data) into event signals. Such a transformation may be performed by establishing a common frequency that best matches a native frequency of the two signals (e.g., an inverse of the greatest common divisor of inverses of the frequencies). Paths in space and time of the two signals may be interpolated and sampled at the common frequency. The resulting points obtained may be at the same exact time by definition. Hence, the matching score described above may be calculated based on evaluating only distance in space.

As further shown in FIG. 1D, and by reference number 145, the tracking system 105 may prevent calculation of the matching score based on determining that the condition exists for the first tracking data and the second tracking data. For example, when the tracking system 105 determines that the condition exists for the first tracking data and the second tracking data, the tracking system 105 may prevent calculation of the matching score. Since calculating matching scores for multiple devices 110 may be resource intensive, the tracking system 105 may prevent such calculations when the tracking system 105 determines that the condition exists for tracking data generated by the multiple devices 110. The tracking system 105 may prevent the calculations of the matching scores when the condition exists since the condition (e.g., described above in connection with FIG. 1C) may indicate that the multiple devices 110 are unrelated. When the tracking system 105 prevents calculation of the matching score based on determining that the condition exists for the first tracking data and the second tracking data, the tracking system 105 may determine that the first device 110-1 is not associated with the second device 110-2.

Figure 1E:
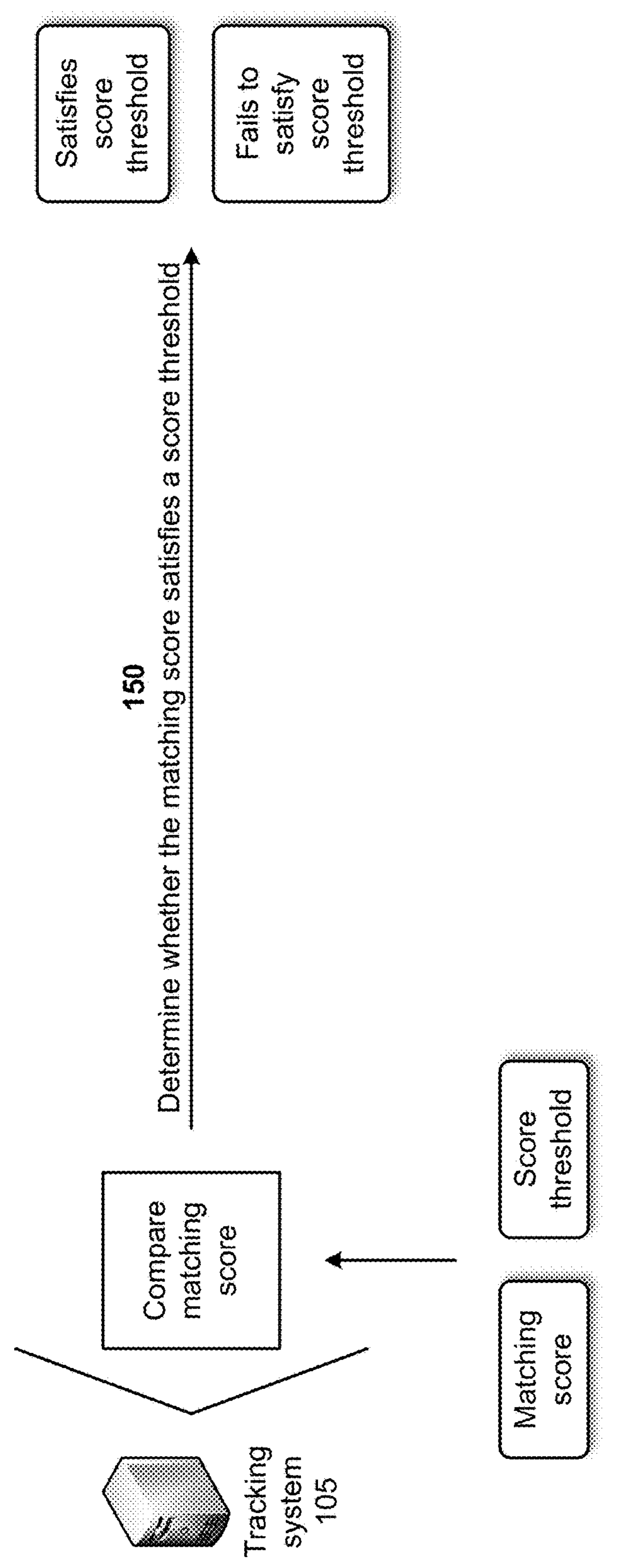

As shown in FIG. 1E, and by reference number 150, the tracking system 105 may determine whether the matching score satisfies a score threshold. For example, the tracking system 105 may define a score threshold that enables determination of whether the first device 110-1 matches or is associated with the second device 110-2. In some implementations, the score threshold may include a percentage value (e.g., 20%, 30%, 40%, and/or the like), where a matching score greater than or equal to the score threshold may indicate that the first device 110-1 is associated with the second device 110-2, and a matching score less than the score threshold may indicate that the first device 110-1 is not associated with the second device 110-2. In some implementations, the tracking system 105 may determine that the matching score satisfies (e.g., is greater than or equal to) the score threshold. Alternatively, the tracking system 105 may determine that the matching score fails to satisfy (e.g., is less than) the score threshold.

Figure 1F:
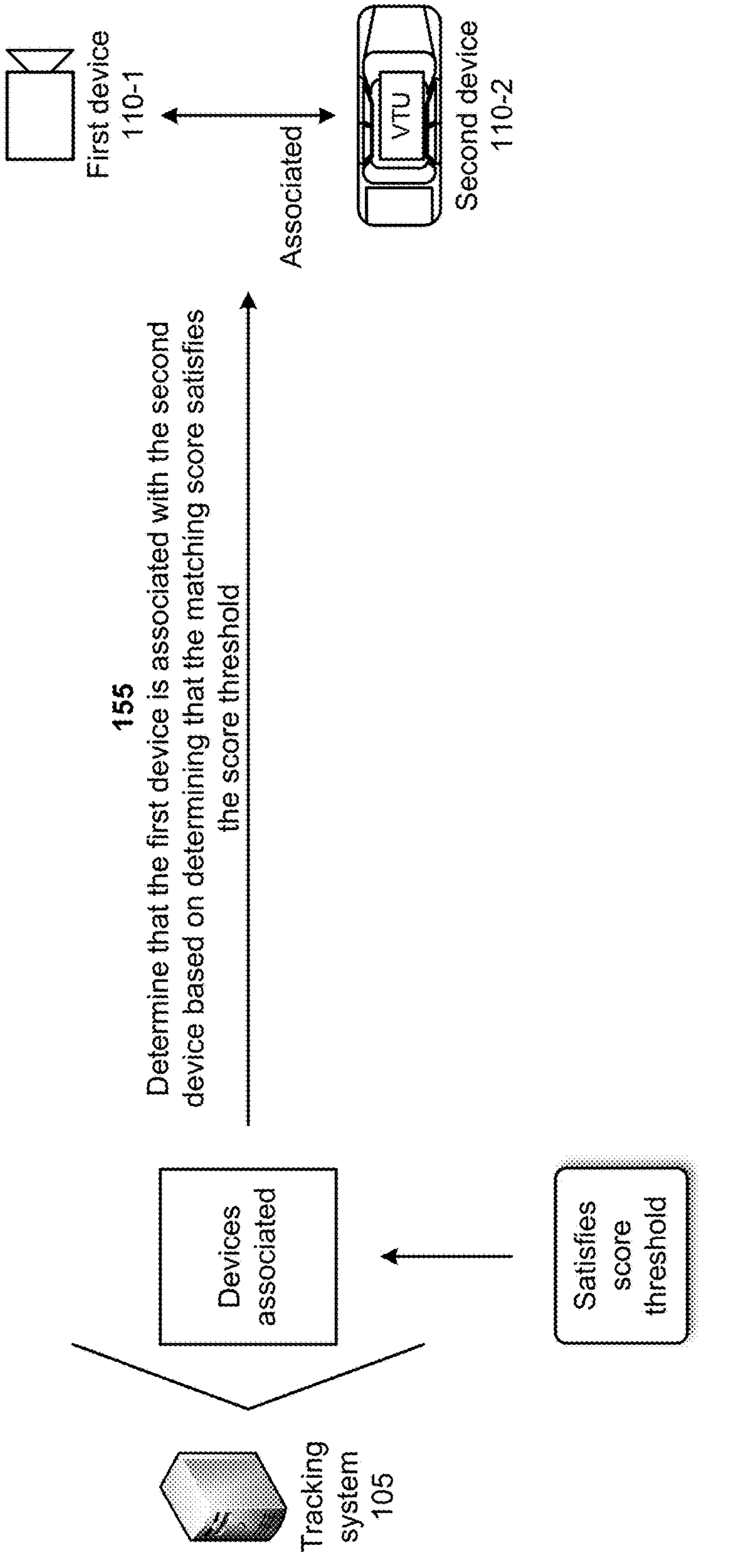

As shown in FIG. 1F, and by reference number 155, the tracking system 105 may determine that the first device 110-1 is associated with the second device 110-2 based on determining that the matching score satisfies the score threshold. For example, when the tracking system determines that the matching score satisfies (e.g., is greater than or equal to) the score threshold, the tracking system 105 may determine that the first device 110-1 is associated with the second device 110-2. The tracking system 105 may utilize the determination that the first device 110-1 is associated with the second device 110-2 to perform the one or more actions described below. In some implementations, the tracking system 105 may utilize the determination that the first device 110-1 (e.g., in a vehicle) is associated with the second device 110-2 (e.g., a mobile phone) to unlock the vehicle with a mobile phone application. The tracking system 105 may track the mobile phone and the vehicle to ensure that the vehicle is not left unattended or that a user of the mobile phone has not lent the mobile phone to an unregistered user.

In some implementations, the tracking system 105 may utilize the determination that the first device 110-1 is associated with the second device 110-2 for monitoring of group interaction. For example, geolocators may be applied to a flock of sheep, a herd of cows, a group of wild animals, a group of people, and/or the like. The tracking system 105 may determine when an animal moves away from one subgroup of animals to another subgroup of animals, or may determine when wild animals move together for a certain time period. In another example, the tracking system 105 may determine whether some people are moving in a concerted manner.

Figure 1G:
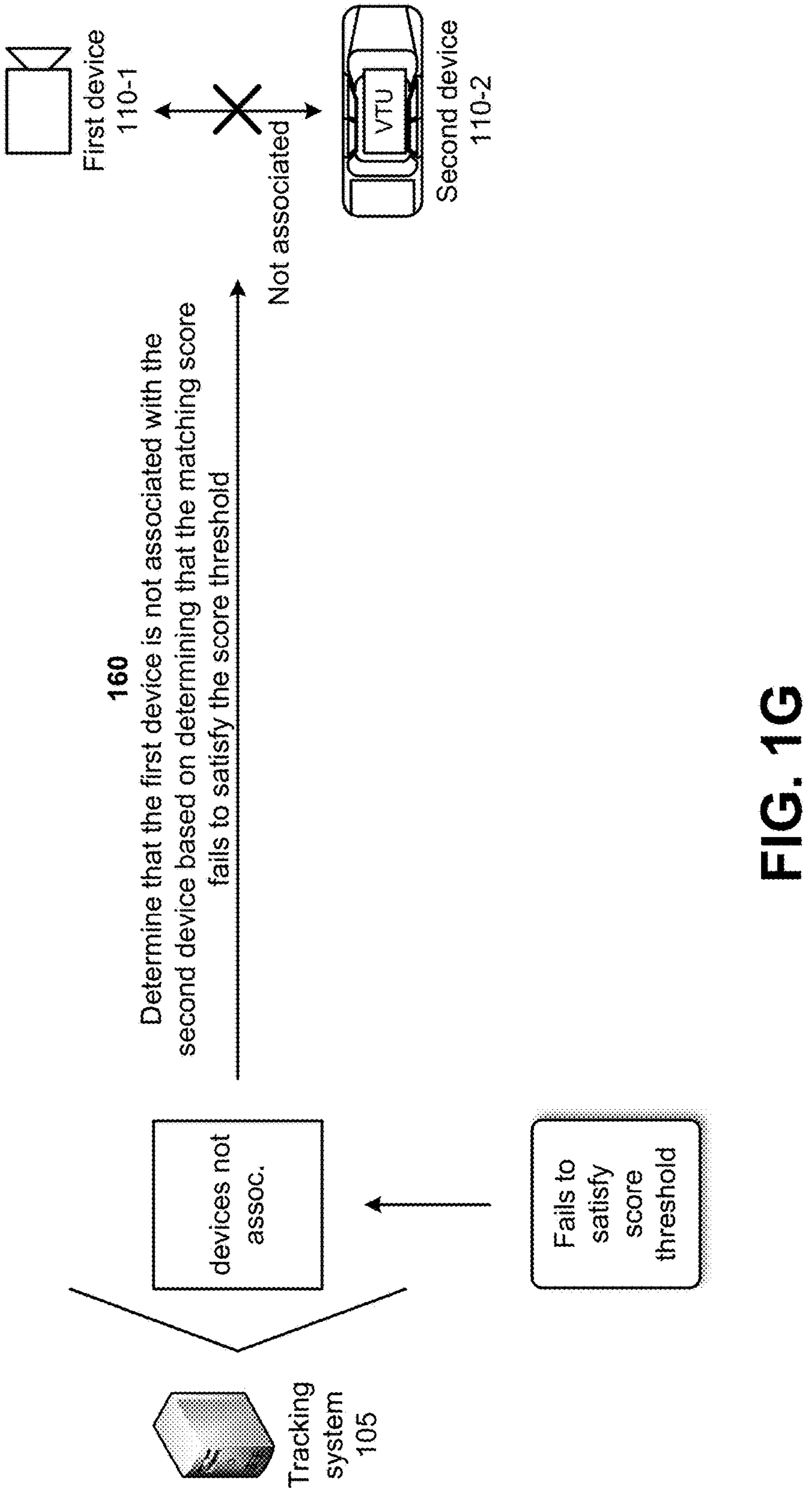

As shown in FIG. 1G, and by reference number 160, the tracking system 105 may determine that the first device 110-1 is not associated with the second device 110-2 based on determining that the matching score fails to satisfy the score threshold. For example, when the tracking system determines that the matching score fails to satisfy (e.g., is less than) the score threshold, the tracking system 105 may determine that the first device 110-1 is not associated with the second device 110-2. In some implementations, the tracking system 105 may compare devices 110 that are not associated with other devices 110 related to the same account, to determine a possible correct pairing. If the tracking system 105 identifies a new pair of devices 110 (e.g., based on exceeding another score threshold), the tracking system 105 may suggest changing a pairing to a customer (for example), may automatically change the pairing, may contact the customer, and/or the like.

As shown in FIG. 1H, and by reference number 165, the tracking system 105 may perform one or more actions based on determining that the first device 110-1 is associated with the second device 110-2. In some implementations, performing the one or more actions includes the tracking system 105 determining that a vehicle is associated with the first device 110-1 and the second device 110-2. For example, a vehicle may include a VTU (e.g., the first device 110-1) to continuously monitor the vehicle location and behavior, and a dashcam (e.g., the second device 110-2) to continuously record driving video footage, GPS coordinates, and a timestamp. When the VTU triggers a harsh driving event, video footage from the dashcam may be retrieved and analyzed to provide further insights to a fleet manager (for example). Determining that the VTU and the dashcam are associated with the same vehicle may enable correct insights to be provided to the fleet manager. In this way, the tracking system 105 may conserve computing resources, networking resources, and/or other resources that would have otherwise been consumed by failing to accurately associate different devices 110.

In some implementations, performing the one or more actions includes the tracking system 105 determining that the first device 110-1 is correctly installed in a vehicle associated with the second device 110-2. For example, a vehicle may include a VTU (e.g., the second device 110-2) and an owner of the vehicle may receive a dashcam (e.g., the first device 110-1) to install in the vehicle. The owner of the vehicle may be billed when the dashcam is correctly installed in the vehicle and paired with the VTU, which may be a manual process subject to errors. The tracking system 105 may automatically detect whether the dashcam is correctly installed in a vehicle based on determining that the first device 110-1 is associated with the second device 110-2. In this way, the tracking system 105 may conserve computing resources, networking resources, and/or other resources that would have otherwise been consumed by failing to provide services based on inaccurate association of different devices 110 (e.g., time and manual reconfiguration required to correct the inaccurate association and the provided services).

In some implementations, performing the one or more actions includes the tracking system 105 determining that a driver associated with the first device 110-1 is correctly utilizing a vehicle associated with the second device 110-2. For example, a driver of a vehicle may be associated with a mobile phone (e.g., the first device 110-1) and the vehicle may include a VTU (e.g., the second device 110-2). The tracking system 105 may utilize a location of the VTU and a trajectory of the mobile phone to automatically perform a vehicle-driver assignment (e.g., assigning a driver to a specific vehicle on a given day or trip). A correct vehicle-driver assignment may enable a fleet manager to correctly account for the driver's activity and to monitor driver behavior (e.g., performing safe driving techniques). In this way, the tracking system 105 may conserve computing resources, networking resources, and/or other resources that would have otherwise been consumed by generating, identifying, or correcting errors with services based on inaccurate association of different devices 110.

In some implementations, performing the one or more actions includes the tracking system 105 determining that an asset associated with the first device 110-1 is correctly paired with a vehicle associated with the second device 110-2. For example, an asset (e.g., a trailer, a container, a package, instrumentation, and/or the like) may be associated with a geolocator (e.g., the first device 110-1) and a vehicle may include a VTU (e.g., the second device 110-2). The asset may be expensive and a fleet manager may want to know which vehicle is carrying the asset. The tracking system 105 may match trajectories of the VTU of the vehicle and the geolocator of the asset to identify which vehicle or driver is in charge of the asset. In this way, the tracking system 105 may conserve computing resources, networking resources, and/or other resources that would have otherwise been consumed by attempting to determine a correct association for a device 110 incorrectly associated with another device 110.

In some implementations, performing the one or more actions includes the tracking system 105 determining that a user of the first device 110-2 operates a vehicle associated with the second device 110-2. For example, a driver of a vehicle may be associated with a mobile phone (e.g., the first device 110-1) and the vehicle may include a VTU (e.g., the second device 110-2). The tracking system 105 may utilize a trajectory of the VTU and a trajectory of the mobile phone to determine that the driver is operating the vehicle associated with the VTU. In this way, the tracking system 105 may conserve computing resources, networking resources, and/or other resources that would have otherwise been consumed by failing to accurately associate different devices 110.

In this way, the tracking system 105 provides location tracking and association of multiple devices. For example, the tracking system 105 may match two or more trajectories generated by two or more independent devices 110. The tracking system 105 may match two or more devices 110 based on considering both spatial information and temporal information associated with the two or more trajectories. The tracking system 105 may determine that the two or more devices 110 have matching trajectories if the two or more devices 110 cover a same path at a same time. Matching two or more trajectories both spatially and temporally may enable the tracking system 105 to ensure accuracy in geospatial services. Thus, the tracking system 105 may conserve computing resources, networking resources, and/or other resources that would have otherwise been consumed by failing to accurately associate different devices 110, failing to provide services based on inaccurate association of different devices 110, generating errors with services based on inaccurate association of different devices 110, attempting to determine a correct association for a device 110 incorrectly associated with another device 110, and/or the like.

As indicated above, FIGS. 1A-1H are provided as an example. Other examples may differ from what is described with regard to FIGS. 1A-1H. The number and arrangement of devices shown in FIGS. 1A-1H are provided as an example. In practice, there may be additional devices, fewer devices, different devices, or differently arranged devices than those shown in FIGS. 1A-1H. Furthermore, two or more devices shown in FIGS. 1A-1H may be implemented within a single device, or a single device shown in FIGS. 1A-1H may be implemented as multiple, distributed devices. Additionally, or alternatively, a set of devices (e.g., one or more devices) shown in FIGS. 1A-1H may perform one or more functions described as being performed by another set of devices shown in FIGS. 1A-1H.

Figure 2:
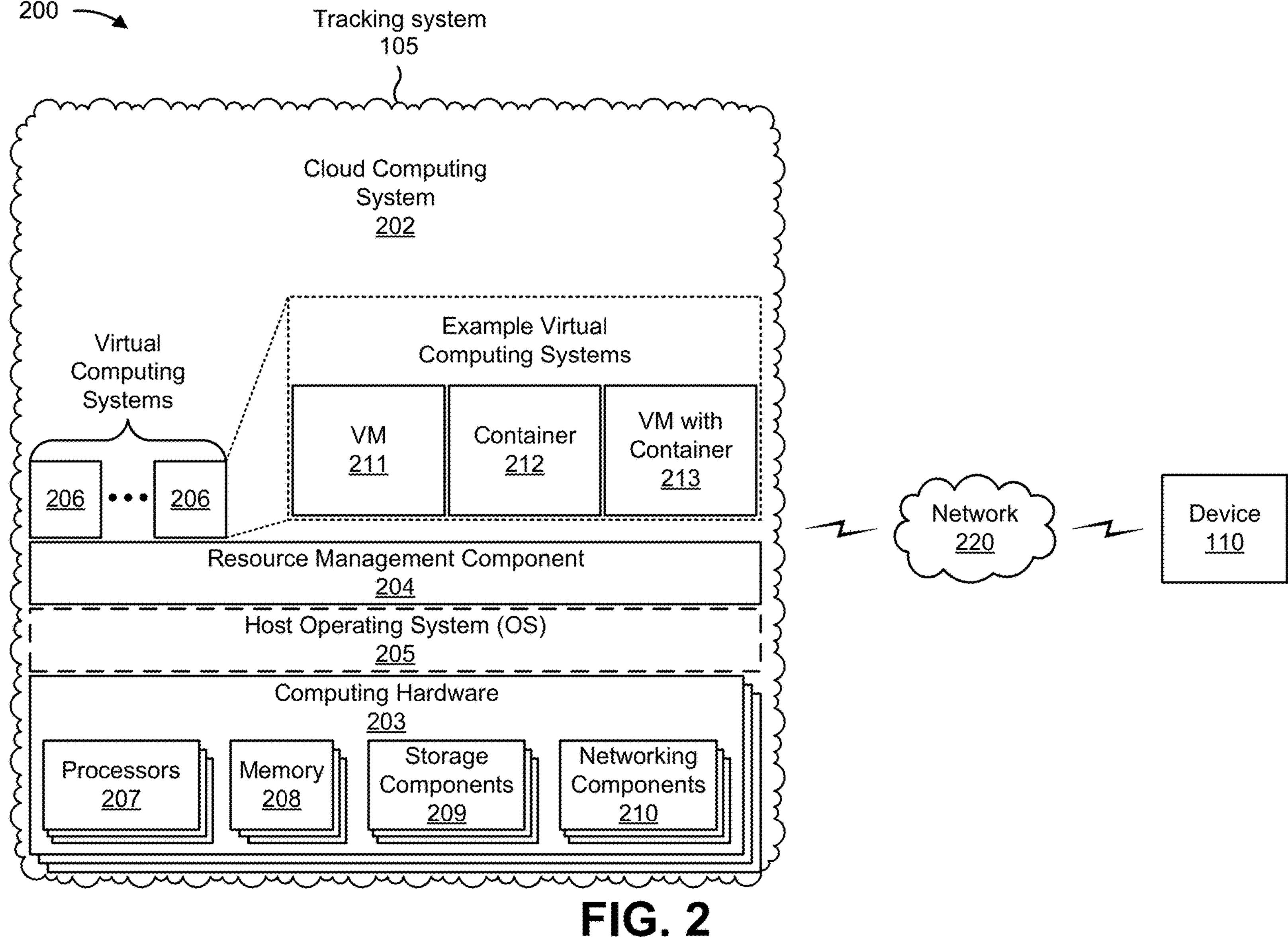
FIG. 2 is a diagram of an example environment in which systems and/or methods described herein may be implemented.

FIG. 2 is a diagram of an example environment 200 in which systems and/or methods described herein may be implemented. As shown in FIG. 2, the environment 200 may include the tracking system 105, which may include one or more elements of and/or may execute within a cloud computing system 202. The cloud computing system 202 may include one or more elements 203-213, as described in more detail below. As further shown in FIG. 2, the environment 200 may include a network 220 and/or a device 110. Devices and/or elements of the environment 200 may interconnect via wired connections and/or wireless connections.

The device 110 may include one or more devices capable of receiving, generating, storing, processing, and/or providing information, as described elsewhere herein. The device 110 may include a communication device and/or a computing device. For example, the device 110 may include a wireless communication device, a mobile phone, a user equipment, a laptop computer, a tablet computer, a desktop computer, a gaming console, a set-top box, a wearable communication device (e.g., a smart wristwatch, a pair of smart eyeglasses, a head mounted display, or a virtual reality headset), a dashcam, a VTU, an asset tracker, or a similar type of device.

The cloud computing system 202 includes computing hardware 203, a resource management component 204, a host operating system (OS) 205, and/or one or more virtual computing systems 206. The cloud computing system 202 may execute on, for example, an Amazon Web Services platform, a Microsoft Azure platform, or a Snowflake platform. The resource management component 204 may perform virtualization (e.g., abstraction) of the computing hardware 203 to create the one or more virtual computing systems 206. Using virtualization, the resource management component 204 enables a single computing device (e.g., a computer or a server) to operate like multiple computing devices, such as by creating multiple isolated virtual computing systems 206 from the computing hardware 203 of the single computing device. In this way, the computing hardware 203 can operate more efficiently, with lower power consumption, higher reliability, higher availability, higher utilization, greater flexibility, and lower cost than using separate computing devices.

The computing hardware 203 includes hardware and corresponding resources from one or more computing devices. For example, the computing hardware 203 may include hardware from a single computing device (e.g., a single server) or from multiple computing devices (e.g., multiple servers), such as multiple computing devices in one or more data centers. As shown, the computing hardware 203 may include one or more processors 207, one or more memories 208, one or more storage components 209, and/or one or more networking components 210. Examples of a processor, a memory, a storage component, and a networking component (e.g., a communication component) are described elsewhere herein.

The resource management component 204 includes a virtualization application (e.g., executing on hardware, such as the computing hardware 203) capable of virtualizing computing hardware 203 to start, stop, and/or manage one or more virtual computing systems 206. For example, the resource management component 204 may include a hypervisor (e.g., a bare-metal or Type 1 hypervisor, a hosted or Type 2 hypervisor, or another type of hypervisor) or a virtual machine monitor, such as when the virtual computing systems 206 are virtual machines 211. Additionally, or alternatively, the resource management component 204 may include a container manager, such as when the virtual computing systems 206 are containers 212. In some implementations, the resource management component 204 executes within and/or in coordination with a host operating system 205.

A virtual computing system 206 includes a virtual environment that enables cloud-based execution of operations and/or processes described herein using the computing hardware 203. As shown, the virtual computing system 206 may include a virtual machine 211, a container 212, or a hybrid environment 213 that includes a virtual machine and a container, among other examples. The virtual computing system 206 may execute one or more applications using a file system that includes binary files, software libraries, and/or other resources required to execute applications on a guest operating system (e.g., within the virtual computing system 206) or the host operating system 205.

Although the tracking system 105 may include one or more elements 203-213 of the cloud computing system 202, may execute within the cloud computing system 202, and/or may be hosted within the cloud computing system 202, in some implementations, the tracking system 105 may not be cloud-based (e.g., may be implemented outside of a cloud computing system) or may be partially cloud-based. For example, the tracking system 105 may include one or more devices that are not part of the cloud computing system 202, such as a device 300 of FIG. 3, which may include a standalone server or another type of computing device. The tracking system 105 may perform one or more operations and/or processes described in more detail elsewhere herein.

The network 220 includes one or more wired and/or wireless networks. For example, the network 220 may include a cellular network, a public land mobile network (PLMN), a local area network (LAN), a wide area network (WAN), a private network, the Internet, and/or a combination of these or other types of networks. The network 220 enables communication among the devices of the environment 200.

The number and arrangement of devices and networks shown in FIG. 2 are provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of the environment 200 may perform one or more functions described as being performed by another set of devices of the environment 200.

Figure 3:
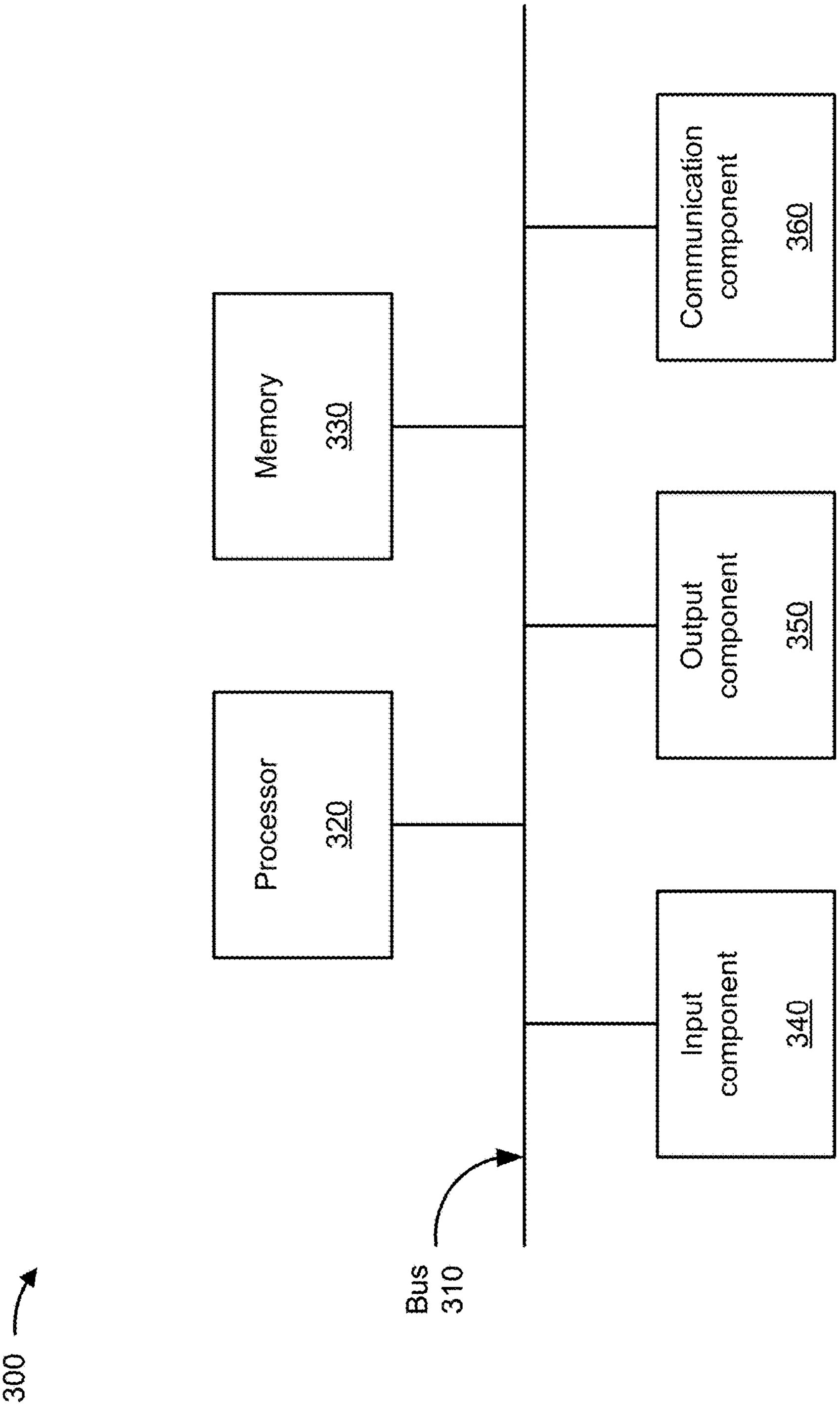
FIG. 3 is a diagram of example components of one or more devices of FIG. 2.

FIG. 3 is a diagram of example components of a device 300, which may correspond to the tracking system 105 and/or the device 110. In some implementations, the tracking system 105 and/or the device 110 may include one or more devices 300 and/or one or more components of the device 300. As shown in FIG. 3, the device 300 may include a bus 310, a processor 320, a memory 330, an input component 340, an output component 350, and a communication component 360.

The bus 310 includes one or more components that enable wired and/or wireless communication among the components of the device 300. The bus 310 may couple together two or more components of FIG. 3, such as via operative coupling, communicative coupling, electronic coupling, and/or electric coupling. The processor 320 includes a central processing unit, a graphics processing unit, a microprocessor, a controller, a microcontroller, a digital signal processor, a field-programmable gate array, an application-specific integrated circuit, and/or another type of processing component. The processor 320 is implemented in hardware, firmware, or a combination of hardware and software. In some implementations, the processor 320 includes one or more processors capable of being programmed to perform one or more operations or processes described elsewhere herein.

The memory 330 includes volatile and/or nonvolatile memory. For example, the memory 330 may include random access memory (RAM), read only memory (ROM), a hard disk drive, and/or another type of memory (e.g., a flash memory, a magnetic memory, and/or an optical memory). The memory 330 may include internal memory (e.g., RAM, ROM, or a hard disk drive) and/or removable memory (e.g., removable via a universal serial bus connection). The memory 330 may be a non-transitory computer-readable medium. The memory 330 stores information, instructions, and/or software (e.g., one or more software applications) related to the operation of the device 300. In some implementations, the memory 330 includes one or more memories that are coupled to one or more processors (e.g., the processor 320), such as via the bus 310.

The input component 340 enables the device 300 to receive input, such as user input and/or sensed input. For example, the input component 340 may include a touch screen, a keyboard, a keypad, a mouse, a button, a microphone, a switch, a sensor, a global positioning system sensor, an accelerometer, a gyroscope, and/or an actuator. The output component 350 enables the device 300 to provide output, such as via a display, a speaker, and/or a light-emitting diode. The communication component 360 enables the device 300 to communicate with other devices via a wired connection and/or a wireless connection. For example, the communication component 360 may include a receiver, a transmitter, a transceiver, a modem, a network interface card, and/or an antenna.

The device 300 may perform one or more operations or processes described herein. For example, a non-transitory computer-readable medium (e.g., the memory 330) may store a set of instructions (e.g., one or more instructions or code) for execution by the processor 320. The processor 320 may execute the set of instructions to perform one or more operations or processes described herein. In some implementations, execution of the set of instructions, by one or more processors 320, causes the one or more processors 320 and/or the device 300 to perform one or more operations or processes described herein. In some implementations, hardwired circuitry may be used instead of or in combination with the instructions to perform one or more operations or processes described herein. Additionally, or alternatively, the processor 320 may be configured to perform one or more operations or processes described herein. Thus, implementations described herein are not limited to any specific combination of hardware circuitry and software.

The number and arrangement of components shown in FIG. 3 are provided as an example. The device 300 may include additional components, fewer components, different components, or differently arranged components than those shown in FIG. 3. Additionally, or alternatively, a set of components (e.g., one or more components) of the device 300 may perform one or more functions described as being performed by another set of components of the device 300.

Figure 4:
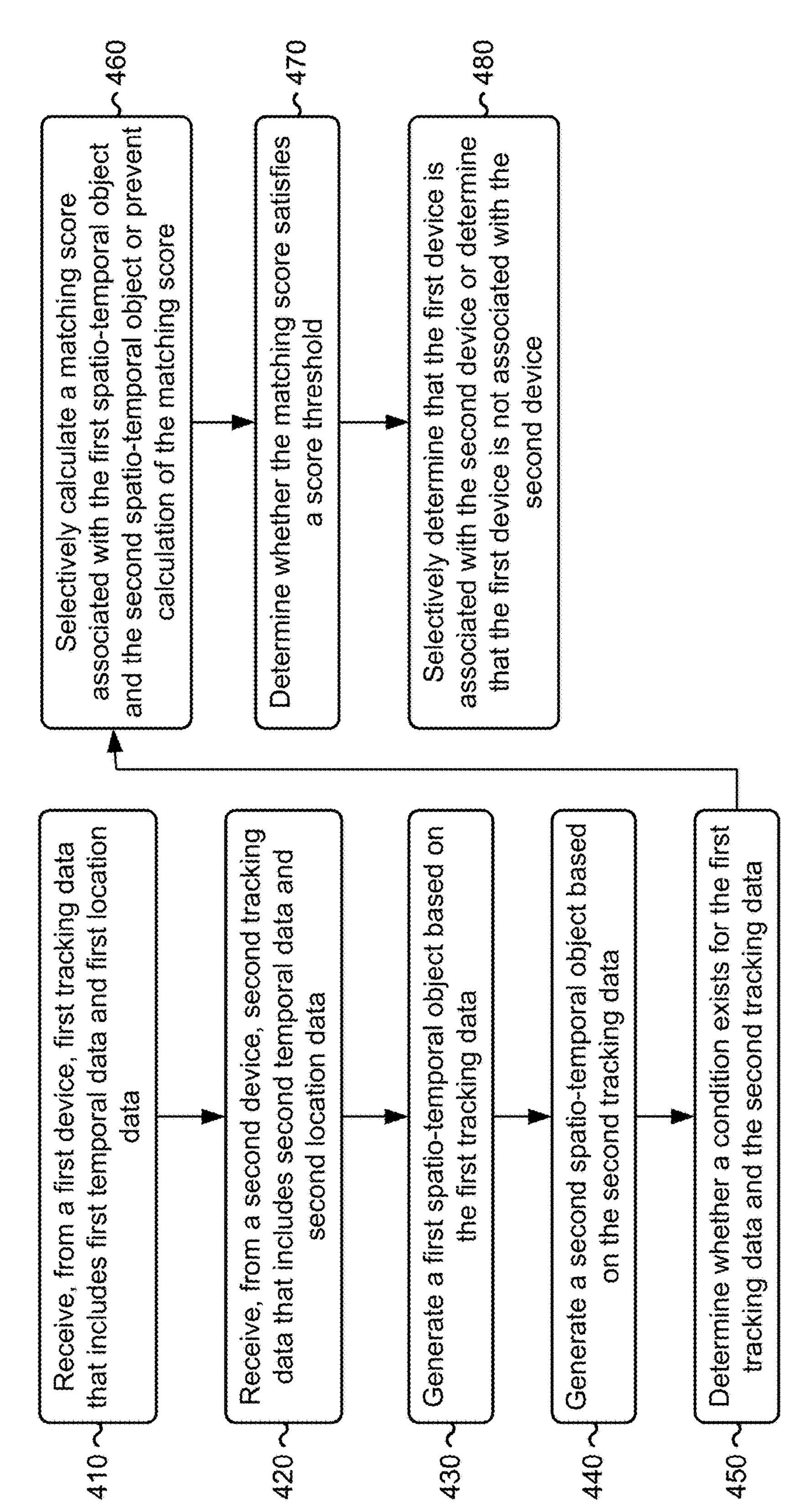
FIG. 4 is a flowchart of an example process for location tracking and association of multiple devices.

FIG. 4 depicts a flowchart of an example process 400 for location tracking and association of multiple devices. In some implementations, one or more process blocks of FIG. 4 may be performed by a device (e.g., the tracking system 105). In some implementations, one or more process blocks of FIG. 4 may be performed by another device or a group of devices separate from or including the device. Additionally, or alternatively, one or more process blocks of FIG. 4 may be performed by one or more components of the device 300, such as the processor 320, the memory 330, the input component 340, the output component 350, and/or the communication component 360.

As shown in FIG. 4, process 400 may include receiving, from a first device, first tracking data that includes first temporal data and first location data (block 410). For example, the device may receive, from a first device, first tracking data that includes first temporal data and first location data, as described above. In some implementations, the first temporal data includes first timestamps associated with the first tracking data, and the first location data includes latitudes and longitudes associated with the first tracking data. In some implementations, the first tracking data is one of: generated at a fixed frequency, generated based on events, or generated at the fixed frequency and based on the events.

As further shown in FIG. 4, process 400 may include receiving, from a second device, second tracking data that includes second temporal data and second location data (block 420). For example, the device may receive, from a second device, second tracking data that includes second temporal data and second location data, as described above. In some implementations, the second temporal data includes second timestamps associated with the second tracking data, and the second location data includes latitudes and longitudes associated with the second tracking data. In some implementations, the second tracking data is one of: generated at a fixed frequency, generated based on events, or generated at the fixed frequency and based on the events. In some implementations, the first device or the second device is one of: a vehicle tracking unit, a dashcam, a geolocator, a mobile telephone, a tablet computer, or an asset with a geolocator. In some implementations, the first device is a dashcam and the second device is a vehicle tracking unit.

As further shown in FIG. 4, process 400 may include generating a first spatio-temporal object based on the first tracking data (block 430). For example, the device may generate a first spatio-temporal object based on the first tracking data, as described above. In some implementations, generating the first spatio-temporal object based on the first tracking data includes one of: generating images of a series of ellipsoids based on the first tracking data, or generating an image of a continuous time-space tube based on the first tracking data.

As further shown in FIG. 4, process 400 may include generating a second spatio-temporal object based on the second tracking data (block 440). For example, the device may generate a second spatio-temporal object based on the second tracking data, as described above. In some implementations, generating the second spatio-temporal object based on the second tracking data includes one of: generating images of a series of ellipsoids based on the second tracking data, or generating an image of a continuous time-space tube based on the second tracking data.

As further shown in FIG. 4, process 400 may include determining whether a condition exists for the first tracking data and the second tracking data (block 450). For example, the device may determine whether a condition exists for the first tracking data and the second tracking data, as described above. In some implementations, the condition includes one or more of: a first trajectory duration associated with the first tracking data fails to match a second trajectory duration associated with the second tracking data, a first spatial bounding box associated with the first tracking data fails to intersect a second spatial bounding box associated with the second tracking data, a first temporal span associated with the first tracking data fails to intersect a second temporal span associated with the second tracking data, or the first device and the second device are associated with different accounts.

As further shown in FIG. 4, process 400 may include selectively calculating a matching score associated with the first spatio-temporal object and the second spatio-temporal object or preventing calculation of the matching score (block 460). For example, the device may selectively: calculate a matching score associated with the first spatio-temporal object and the second spatio-temporal object based on determining that the condition does not exist for the first tracking data and the second tracking data, or prevent calculation of the matching score based on determining that the condition exists for the first tracking data and the second tracking data, as described above. In some implementations, calculating the matching score associated with the first spatio-temporal object and the second spatio-temporal object includes calculating, as the matching score, an intersection over union between the first spatio-temporal object and the second spatio-temporal object.

As further shown in FIG. 4, process 400 may include determining whether the matching score satisfies a score threshold (block 470). For example, the device may determine whether the matching score satisfies a score threshold, as described above.

As further shown in FIG. 4, process 400 may include selectively: determining that the first device is associated with the second device based on determining that the matching score satisfies the score threshold, or determining that the first device is not associated with the second device based on determining that the matching score fails to satisfy the score threshold (block 480). For example, the device may selectively: determine that the first device is associated with the second device based on determining that the matching score satisfies the score threshold, or determine that the first device is not associated with the second device based on determining that the matching score fails to satisfy the score threshold, as described above.

In some implementations, process 400 includes performing one or more actions based on determining that the first device is associated with the second device. In some implementations, performing the one or more actions includes one or more of determining that a vehicle is associated with the first device and the second device, determining that the first device is correctly installed in a vehicle associated with the second device, or determining that a driver associated with the first device is correctly utilizing a vehicle associated with the second device. In some implementations, performing the one or more actions includes one or more of determining that an asset associated with the first device is correctly paired with a vehicle associated with the second device, or determining that a user of the first device operates a vehicle associated with the second device.

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel.

As used herein, the term "component" is intended to be broadly construed as hardware, firmware, or a combination of hardware and software. It will be apparent that systems and/or methods described herein may be implemented in different forms of hardware, firmware, and/or a combination of hardware and software. The actual specialized control hardware or software code used to implement these systems and/or methods is not limiting of the implementations. Thus, the operation and behavior of the systems and/or methods are described herein without reference to specific software code—it being understood that software and hardware can be used to implement the systems and/or methods based on the description herein.

As used herein, satisfying a threshold may, depending on the context, refer to a value being greater than the threshold, greater than or equal to the threshold, less than the threshold, less than or equal to the threshold, equal to the threshold, not equal to the threshold, or the like.

To the extent the aforementioned implementations collect, store, or employ personal information of individuals, it should be understood that such information shall be used in accordance with all applicable laws concerning protection of personal information. Additionally, the collection, storage, and use of such information can be subject to consent of the individual to such activity, for example, through well known "opt-in" or "opt-out" processes as can be appropriate for the situation and type of information. Storage and use of personal information can be in an appropriately secure manner reflective of the type of information, for example, through various encryption and anonymization techniques for particularly sensitive information.

Even though particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set. As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiple of the same item.

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, or a combination of related and unrelated items), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

In the preceding specification, various example embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

What is claimed is:

1. A method, comprising:

receiving, by a device and from a first device, first tracking data that includes first temporal data and first location data;

receiving, by the device and from a second device, second tracking data that includes second temporal data and second location data;

generating, by the device, a first spatio-temporal object based on the first tracking data;

generating, by the device, a second spatio-temporal object based on the second tracking data;

determining, by the device, whether a condition exists for the first tracking data and the second tracking data, wherein the condition includes one or more of:

a first trajectory duration associated with the first tracking data fails to match a second trajectory duration associated with the second tracking data, a first spatial bounding box associated with the first tracking data fails to intersect a second spatial bounding box associated with the second tracking data, a first temporal span associated with the first tracking data fails to intersect a second temporal span associated with the second tracking data, or the first device and the second device are associated with different accounts;

calculating, by the device, a matching score associated with the first spatio-temporal object and the second spatio-temporal object based on determining that the condition does not exist for the first tracking data and the second tracking data;

preventing, by the device, calculation of the matching score based on determining that the condition exists for the first tracking data and the second tracking data;

determining, by the device, whether the matching score satisfies a score threshold;

determining, by the device, that the first device is associated with the second device based on determining that the matching score satisfies the score threshold; and determining, by the device, that the first device is not associated with the second device based on determining that the matching score fails to satisfy the score threshold.

2. The method of claim 1, further comprising:

performing one or more actions based on determining that the first device is associated with the second device.

3. The method of claim 2, wherein performing the one or more actions comprises one or more of:

determining that a vehicle is associated with the first device and the second device;

determining that the first device is correctly installed in a vehicle associated with the second device; or determining that a driver associated with the first device is correctly utilizing a vehicle associated with the second device.

4. The method of claim 2, wherein performing the one or more actions comprises one or more of:

determining that an asset associated with the first device is correctly paired with a vehicle associated with the second device; or determining that a user of the first device operates a vehicle associated with the second device.

5. The method of claim 1, wherein the first temporal data includes first timestamps associated with the first tracking data, and the first location data includes latitudes and longitudes associated with the first tracking data, and wherein the second temporal data includes second timestamps associated with the second tracking data, and the second location data includes latitudes and longitudes associated with the second tracking data.

6. The method of claim 1, wherein generating the first spatio-temporal object based on the first tracking data comprises one of:

generating images of a series of ellipsoids based on the first tracking data; or generating an image of a continuous time-space tube based on the first tracking data.

7. The method of claim 1, wherein generating the second spatio-temporal object based on the second tracking data comprises one of:

generating images of a series of ellipsoids based on the second tracking data; or generating an image of a continuous time-space tube based on the second tracking data.

8. The method of claim 1, wherein the condition indicates that the first device and the second device are unrelated.

9. A device, comprising:

one or more memories; and one or more processors, coupled to the one or more memories, configured to:

receive, from a first device, first tracking data that includes first temporal data and first location data;

receive, from a second device, second tracking data that includes second temporal data and second location data;

generate a first spatio-temporal object based on the first tracking data;

generate a second spatio-temporal object based on the second tracking data;

determine whether a condition exists for the first tracking data and the second tracking data, wherein the condition includes one or more of:

a first trajectory duration associated with the first tracking data fails to match a second trajectory duration associated with the second tracking data, a first spatial bounding box associated with the first tracking data fails to intersect a second spatial bounding box associated with the second tracking data, a first temporal span associated with the first tracking data fails to intersect a second temporal span associated with the second tracking data, or the first device and the second device are associated with different accounts;

prevent calculation of a matching score based on determining that the condition exists for the first tracking data and the second tracking data;

calculate the matching score associated with the first spatio-temporal object and the second spatio-temporal object based on determining that the condition does not exist for the first tracking data and the second tracking data;

determine whether the matching score satisfies a score threshold;

determine that the first device is associated with the second device based on determining that the matching score satisfies the score threshold; and determine that the first device is not associated with the second device based on determining that the matching score fails to satisfy the score threshold.

10. The device of claim 9, wherein the one or more processors, to generate the first spatio-temporal object based on the first tracking data, are configured to one of:

generate images of a series of ellipsoids based on the first tracking data; or generate an image of a continuous time-space tube based on the first tracking data.

11. The device of claim 9, wherein the one or more processors, to generate the second spatio-temporal object based on the second tracking data, are configured to one of:
generate images of a series of ellipsoids based on the second tracking data; or
generate an image of a continuous time-space tube based on the second tracking data.

12. The device of claim 9, wherein the one or more processors, to calculate the matching score associated with the first spatio-temporal object and the second spatio-temporal object, are configured to:
calculate, as the matching score, an intersection over union between the first spatio-temporal object and the second spatio-temporal object.

13. The device of claim 9, wherein the first device or the second device is one of a vehicle tracking unit, a dashcam, a geolocator, a mobile telephone, a tablet computer, or an asset with a geolocator.

14. The device of claim 9, wherein the first device is a dashcam and the second device is a vehicle tracking unit.

15. A non-transitory computer-readable medium storing a set of instructions, the set of instructions comprising:
one or more instructions that, when executed by one or more processors of a device, cause the device to:
receive, from a first device, first tracking data that includes first temporal data and first location data;
receive, from a second device, second tracking data that includes second temporal data and second location data;
generate a first spatio-temporal object based on the first tracking data;
generate a second spatio-temporal object based on the second tracking data;
determine whether a condition exists for the first tracking data and the second tracking data, wherein the condition includes one or more of:
a first trajectory duration associated with the first tracking data fails to match a second trajectory duration associated with the second tracking data,
a first spatial bounding box associated with the first tracking data fails to intersect a second spatial bounding box associated with the second tracking data,
a first temporal span associated with the first tracking data fails to intersect a second temporal span associated with the second tracking data, or
the first device and the second device are associated with different accounts;
calculate a matching score associated with the first spatio-temporal object and the second spatio-temporal object based on determining that the condition does not exist for the first tracking data and the second tracking data;
prevent calculation of the matching score based on determining that the condition exists for the first tracking data and the second tracking data;
determine whether the matching score satisfies a score threshold;
determine that the first device is associated with the second device based on determining that the matching score satisfies the score threshold; and
perform one or more actions based on determining that the first device is associated with the second device.

16. The non-transitory computer-readable medium of claim 15, wherein the one or more instructions, that cause the device to perform the one or more actions, cause the device to one or more of:
determine that a vehicle is associated with the first device and the second device;
determine that the first device is correctly installed in a vehicle associated with the second device;
determine that a driver associated with the first device is correctly utilizing a vehicle associated with the second device;
determine that an asset associated with the first device is correctly paired with a vehicle associated with the second device; or
determine that a user of the first device operates a vehicle associated with the second device.

17. The non-transitory computer-readable medium of claim 15, wherein the first temporal data includes first timestamps associated with the first tracking data, and the first location data includes latitudes and longitudes associated with the first tracking data, and
wherein the second temporal data includes second timestamps associated with the second tracking data, and the second location data includes latitudes and longitudes associated with the second tracking data.

18. The non-transitory computer-readable medium of claim 15,
wherein the first tracking data is one of: generated at a fixed frequency, generated based on events, or generated at a fixed frequency and based on events, and
wherein the second tracking data is one of: generated at a fixed frequency, generated based on events, or generated at a fixed frequency and based on events.

19. The non-transitory computer-readable medium of claim 15, wherein the one or more instructions, that cause the device to generate the first spatio-temporal object based on the first tracking data, cause the device to:
generate images of a series of ellipsoids based on the first tracking data; or
generate an image of a continuous time-space tube based on the first tracking data.

20. The non-transitory computer-readable medium of claim 15, wherein the one or more instructions, that cause the device to generate the second spatio-temporal object based on the second tracking data, cause the device to:
generate images of a series of ellipsoids based on the second tracking data; or
generate an image of a continuous time-space tube based on the second tracking data.

* * * * *